T. D. Voorhees,
Screw Driver,
N°70,923.    Patented Nov. 12, 1867.
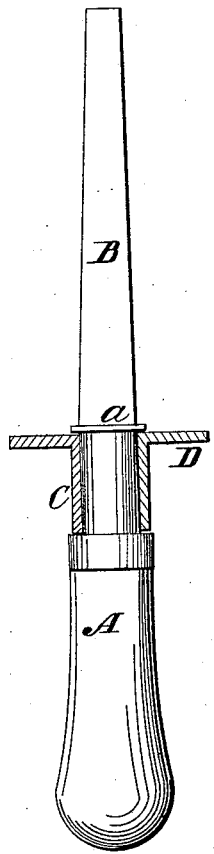
Witnesses:
Theo Insche.
J. A. Service.
Inventor:
T. D. Voorhees.
Per Munn &
Attorneys.

United States Patent Office.

T. D. VOORHEES, OF EASTON, PENNSYLVANIA.

Letters Patent No. 70,923, dated November 12, 1867.

IMPROVEMENT IN SCREW-DRIVERS.

The Schedule referred to in these Letters Patent and making part of the same.

TO ALL WHOM IT MAY CONCERN:

Be it known that I, T. D. VOORHEES, of Easton, Northampton county, Pennsylvania, have invented a new and useful Improvement in Screw-Driver; and I do hereby declare that the following is a full, clear, and exact description thereof, which will enable others skilled in the art to make and use the same, reference being had to the accompanying drawings, forming part of this specification.

This invention consists in forming a portion of the ordinary screw-driver, just below the handles, of a round form, and placing upon it a loose ferrule or thimble in the manner hereinafter described.

The drawing represents a longitudinal section of a screw-driver constructed according to my invention.

A is the handle, and B is the blade of the screw-driver. A small collar at the termination of the round portion is indicated by the letter $a$. C represents the loose thimble. D is a flange on the thimble. The portion of the blade of the screw-driver from and including the collar $a$ to the end of the handle is turned or made round. The thimble C is held in place by the handle and the collar $a$, and in using the screw-driver the thimble would be held by the finger and thumb while turning the screw-driver with the other hand, which would render the use of the tool much more easy and convenient than it now is.

What I claim as new, and desire to secure by Letters Patent, is—

The rotating thimble C, with the flange D, when applied to a screw-driver, substantially as and for the purposes set forth.

The above specification of my invention signed by me this 15th day of April, 1867.

T. D. VOORHEES.

Witnesses:
WM. F. McNAMARA,
ALEX. F. ROBERTS.